April 8, 1952     H. E. SMITH     2,592,075
LIGHT PROJECTOR
Filed June 23, 1950     3 Sheets-Sheet 1
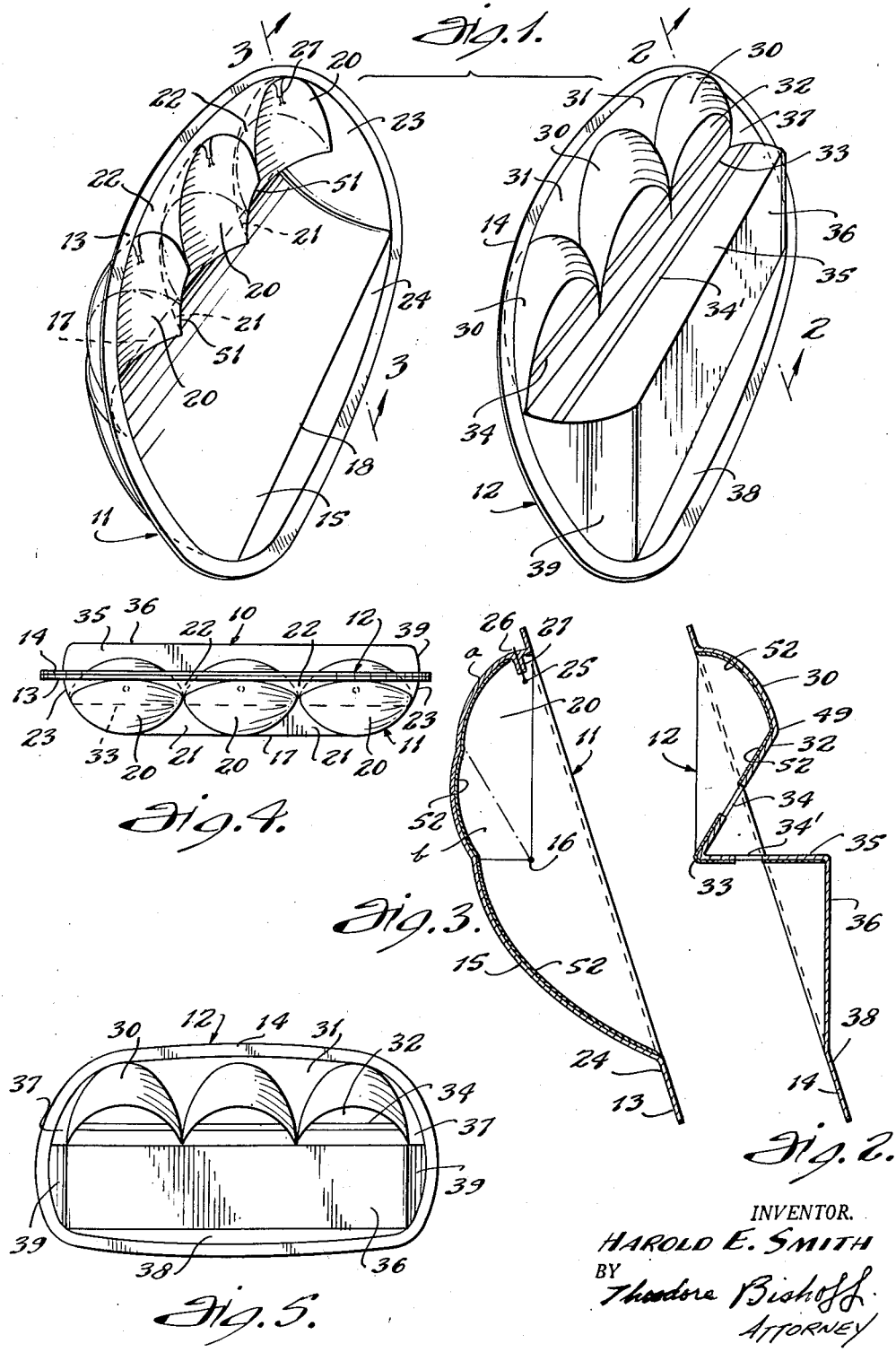
INVENTOR.
HAROLD E. SMITH
BY Theodore Bishoff
ATTORNEY April 8, 1952 H. E. SMITH 2,592,075
LIGHT PROJECTOR
Filed June 23, 1950 3 Sheets-Sheet 2

INVENTOR.
HAROLD E. SMITH
BY Theodore Bischoff
ATTORNEY

April 8, 1952     H. E. SMITH     2,592,075
LIGHT PROJECTOR
Filed June 23, 1950     3 Sheets-Sheet 3
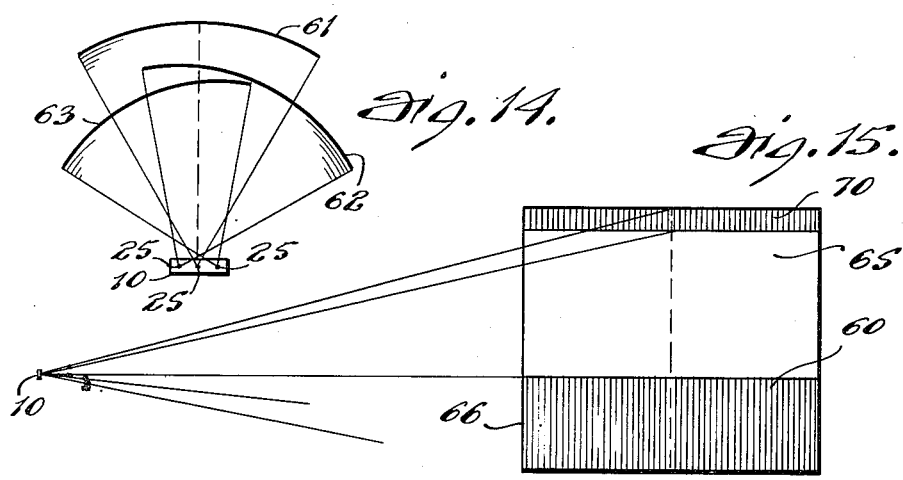
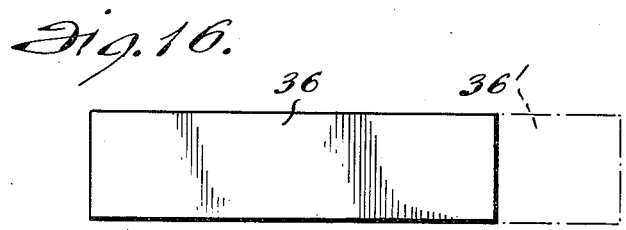
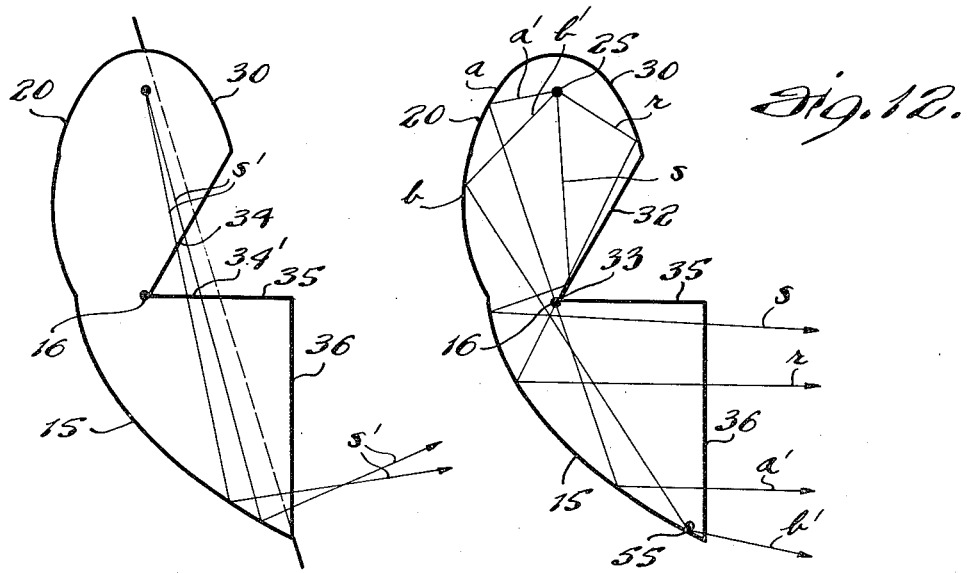
INVENTOR.
HAROLD E. SMITH
BY
Theodore Bishoff
ATTORNEY Patented Apr. 8, 1952

2,592,075

UNITED STATES PATENT OFFICE 2,592,075

LIGHT PROJECTOR

Harold E. Smith, Lykens, Pa.

Application June 23, 1950, Serial No. 169,869

20 Claims. (Cl. 313—114)

This invention relates to an improved light projector employing a plurality of light sources and a plurality of integrated reflectors to obtain a desired light distribution, the invention being exemplified by a multiple headlight unit for automobiles.

One of the objects of my invention lies in the provision of an exceptionally efficient light projector formed by combining a plurality of individual projectors into a single integrated unit capable of projecting a predetermined beam of desired horizontal and vertical distributional intensities.

Another object of my invention lies in the provision of a light projector formed of a plurality of individual projectors in such manner as to permit fabrication by molding or die pressing a minimum number of elements or parts which may be hermetically sealed together to form the integrated projector.

A further object of my invention resides in the combination of a plurality of light sources and reflectors in such manner as to yield an integrated automobile headlamp devoid of glare and in which the light sources are positioned above the horizontal level of the beam cut-off so as to be invisible to approaching drivers and pedestrians.

A still further object of my invention resides in the provision of a single automobile headlamp requiring only one adjustment to the vehicle to project a proper light beam superior to that obtainable with a plurality of headlamps each requiring separate adjustment, and which may be so placed with respect to a vehicle as to protect the lamps from damage and disalignment when the vehicle fenders are damaged.

Still another object of the invention lies in the provision of an integrated automobile headlamp comprised of a plurality of light sources and reflectors which, in addition to a normal driving beam, projects an upwardly angled warning or signal beam.

A still further object of my invention resides in the construction of a multiple light projector comprising a plurality of projectors integrated into a single unit capable of simple fabrication at a lower cost than an equivalent number of individual projectors.

For the attainment of these objects, and additional features and advantages as may hereinafter appear or be pointed out, I have illustrated an embodiment of my invention in the appended drawings, wherein:

Figure 1 is a perspective view of my improved light projector formed in two parts and shown separated prior to sealing together into one unit;

Figure 2 is a section of the forward part or element taken on line 2—2 of Fig. 1;

Figure 3 is a section of the rearward part taken on line 3—3 of Fig. 1;

Figure 4 is a top plan view of the light projector looking in the direction of the plane of its sealing flange;

Figure 5 is a front elevation of the light projector;

Figure 12 is a diagrammatic, vertical sectional view bisecting any one of the ovoid reflectors of the light projector and showing the paths of reflected rays and their vertical distribution;

Figure 13 is a diagram similar to Fig. 12, showing the path of rays forming the warning beam;

Figure 14 is a diagrammatic top plan view showing the horizontal distribution of light beams from the laterally positioned individual light sources in the integrated light projector;

Figure 15 is a diagrammatic view, showing the vertical distribution of rays from the integrated light projector impinged on a vertically positioned screen which is represented for clarity as being swung 90° aside on its center line;

Figure 16 is a diagrammatic front view of the visible portion of my unitary headlamp when installed on a vehicle.

Figure 8:
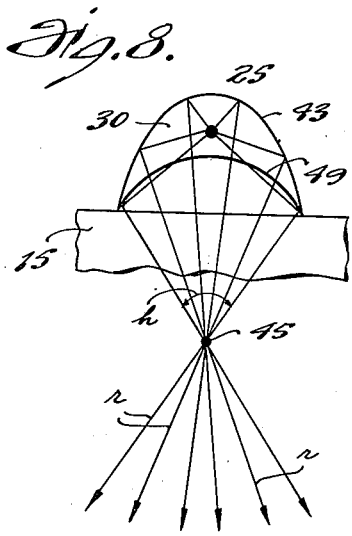
Figure 8 is a diagrammatic front elevation showing the horizontal spread of rays reflected from one of the forward ovoid reflectors when the ovoid reflector is generated to include an elliptical directrix in a vertical plane.

My improved light projector 10 comprises a rear section 11 and a front section or element 12, the two sections being adapted to be hermetically sealed together at their respective sealing flanges 13 and 14.

The rear element 11 includes a reflector 15 which is parabolic in vertical section and cylindrical in shape so that its focal line represented by point 16 in Fig. 3 is parallel to its upper and lower edges, 17 and 18, respectively. Horizontal sections through this reflector are straight lines also parallel to the focal line. Superimposed on the cylindrical reflector 15 are a plurality of ovoidal reflectors 20 connected thereto by non-reflecting surfaces 21. The reflectors 20 are connected to each other and to the peripheral sealing flange by connecting surfaces 22 at the top of the element and surfaces 23 at the sides. Reflector 15 is also connected to the sealing flange 13 by surfaces 23 at the sides which may be reflective and by surface 24 at its bottom. Each of the ovoidal reflectors 20 is provided with a separate light source 25 which is preferably a helically wound filament of small diameter presenting a short line of bright light when electrically heated to incandescence. The filament supports 26 serving as electrical conductors may be embedded in projecting posts 27 of insulating material to support the filaments in substantially the proximate focal regions of the ovoid reflectors 20.

The mating projector element 12 is provided in its upper portions with a plurality of forwardly protruding ovoidal reflectors 30 each of which has a proximate focus substantially coincident with one of the light sources 25, and a remote focal line or area substantially coincident with the focal line 16 of the cylindrical reflector. The reflectors are connected to each other at their upper edges and to the sealing flange 14 by non-reflective surfaces 31. Each reflector 30 is completed at the bottom by an oblique reflecting shield 32 whose lower edge 33 is straight and positioned slightly forward of focal line 16 of the cylindrical reflector when the two mating projector halves are united at their flanges 13 and 14. The lower edges of the reflectors 30 and shield 32 are joined to a substantially vertical, transparent front closure surface 36 by a substantially horizontal surface 35. Shield 32 and member 35 are provided with transparent areas 34 and 34' respectively for purposes to be hereinafter explained. Surface 37 connects the outermost reflectors 30 to the sealing flange while surfaces 38 and 39 connect closure 36 at its bottom and sides to the sealing flange and to surface 35. Connecting surfaces 37, 38 and 39 are normally non-reflective also, since direct rays from light sources 25 will not usually reach these surfaces.

The sealing flange 14, as well as its counterpart 13, is preferably disposed at an oblique angle to the vertically disposed boundary edges of the reflectors 20 and 30 as best shown in Figs. 2 and 3.

Figure 7:
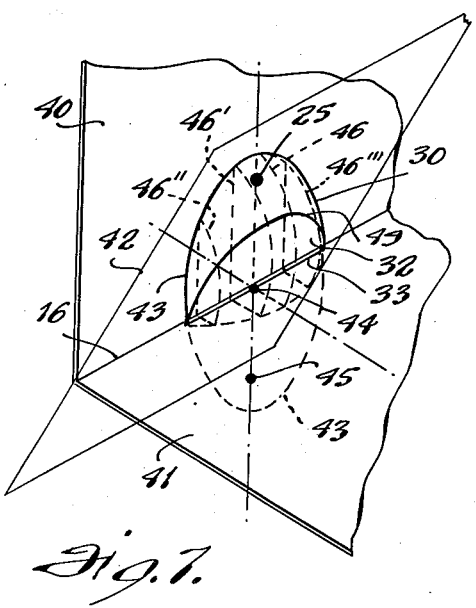
Figure 7 is a perspective view similar to that of Fig. 6, showing the method of generating one of the forwardly positioned ovoid reflectors.

Referring particularly to Fig. 7, there is illustrated a preferred method of forming the ovoid reflectors 30. The illustrated vertical plane 40 is a directrix plane which includes the light source 25 and the focal line 16 of reflector 15. The horizontal plane shown at 41 includes the surface 35 and the lower edge 33 of the reflective shield 32, which is coincident with or spaced only slightly in front of focal line 16. The oblique plane 42 includes the reflective shield 32. An elliptical curve 43 lying in the vertical plane 40 and having foci 25 and 45 may be used as a directrix for generation of the warped surface 30. The primitive generating curve 46 lies in a plane normal to plane 40 and includes the points 25 and 45. The generatrix 46 is a segment of an ellipse having foci at 25 and 44, the latter point being one which falls on line 16. In generating the reflecting surface 30 the generatrix 46 is moved in planes perpendicular to 40 and varied in size, diminishing as it moves away from its initial position in both directions as indicated at 46', 46'' and 46''', while including as directrices the elliptical curve 43, along which moves the vertex of the generatrix, and the line 16 along which moves the remote focus 44 of the generatrix. When fashioned in this manner the ovoid reflector 30 will reflect rays from light source 25 vertically toward focus 44 lying on focal line 16 while converging the rays horizontally toward focus 45 to form a remote focal line or region approximately coincident with focal line 16 of the ultimate reflector. It should be noted that reflector 30 as thus far described is a warped surface generated somewhat similarly to certain of those disclosed in Patents 1,913,518 and 1,913,519, issued jointly to myself and Harry E. Buffington on June 13, 1933, and that other methods of generating such ovoidal reflectors disclosed therein may equally well be used in subject invention provided that when formed they are disposed more vertically than horizontally so as to permit use of a pair of ovoids at the front and rear of a light source and provided further that the remaining parts of the combination are modified in design to match.

The front of reflector 30 is in effect sliced off at any convenient angle by plane 42, representing the plane of the shield or baffle 32, which forms a curved connecting edge 49 with the reflector.

Figure 6:
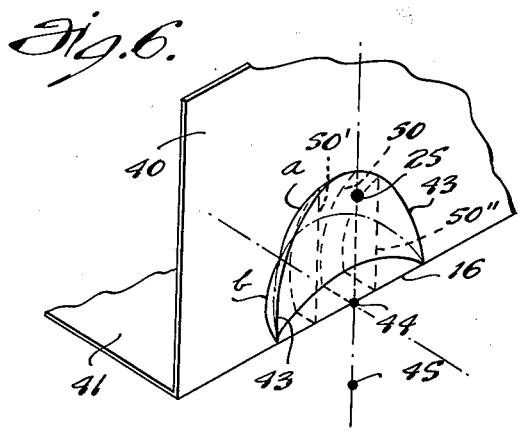
Figure 6 is a perspective view showing the manner of forming one of the rearwardly positioned ovoid reflectors.

The rearwardly disposed ovoids 20 are warped surfaces generated in a manner similar to that described for reflectors 30. As illustrated in Fig. 6 the same ellipse 43 with foci at 25 and 45 may be used as a directrix in vertical plane 40. The primitive generating ellipse 50 and its smaller counterparts 50' and 50'' on each side of a vertical reflector bisecting plane are, however, preferably formed as blended curves including at least two elliptical portions. The uppermost portion $a$ of the generatrix arc 50 is an elliptical segment having foci at 25 and 44, the latter lying on focal line 16. The lowermost segment $b$ of the generatrix is tilted with respect to $a$ and is preferably a section of an ellipse having one focus at 25 and the remote focus at a point 55 spaced below and forwardly of focal line 16 but in such position that all rays from 25 reflected by section $b$ pass behind focal line 16, see Fig. 12. In all other respects ovoids 20 are generated in a manner exactly similar to that utilized and previously described with respect to reflector 30 except that no shield equivalent to 32 is required.

When the two halves of the headlamp are sealed together along their sealing flanges, it will be noted that each light source 25 is located in or near the proximate focus of a vertically disposed ovoidal reflecting surface composed of the pair of reflectors 20 and 30, and which is substantially a complete ovoid truncated at a horizontal plane containing its remote focal line, substantially coincident with the focal line 16 of the cylindrical reflector and the edge 33 of the intersecting reflective shield 32. The composite surface 20—30 is adapted to very efficiently reflect rays, received from a source in a solid angle of approximately 260°, through or rearwardly of the focal line 16 to the parabolic cylinder 15 which in turn reflects the rays forwardly in and below a horizontal cut-off plane which includes the shield edge 33 and the connecting surface 35. The vertical distribution of the reflected rays is illustrated in Fig. 12. From this figure it will be evident that forwardly directed rays $r$ are reflected by ovoid 30 through the focal line 16 of the parabolic reflector 15 so that upon impingement on the latter they are reflected a second time in horizontal planes through the front transparent cover 36. Rays $a'$ striking the uppermost section of the rearwardly disposed ovoid 20 are also reflected through focal line 16. Rays $a'$ strike the parabolic reflector 15 and are reflected forwardly in horizontal planes. Rays $b'$ are reflected by the lower portion of the ovoid 20 to its remote focal line 55 and upon impinging the parabolic reflector in this region are re-reflected to emerge from the headlamp in downwardly angled directions adapted to light the roadway adjacent the vehicles. The rays $s$ which strike the lowermost portions of the reflecting shields 32 are reflected to the cylindrical reflector 15 as if from a source positioned rearward of its focal line 16, and consequently these rays are also reflected to emerge from the headlamp at slight downward angles.

The upwardly directed signal beam is formed by rays S' passing through the transparent areas 34 and 34' in members 32 and 35 respectively, and striking the parabolic reflector as if from a source located in front of its focal line 16, see Fig. 13. These rays are therefore reflected to emerge from the headlamp at an upward angle which may be selected to avoid glare in the eyes of oncoming drivers or pedestrians. A beam so directed is useful to warn drivers of the approach of vehicles along roads crossing the highway and particularly in foggy weather.

Figure 8 illustrates the paths of rays reflected from a front ovoid 30 and lying in the plane of its rear, vertical boundary edge, that is in plane 40 of Fig. 7. Such rays are reflected to converge toward remote focus 45 of directrix ellipse 43. Rays striking other portions of reflector 30 are also reflected substantially through focal line 16 and similarly converge toward a reflector bisecting plane and more particularly toward a circular arc therein containing point 45 and centered on point 44. Upon striking the ultimate cylindrical reflector 15 these converging rays are reflected a second time, (not illustrated) and following the laws of reflection result in a horizontal beam of light which has a lateral or horizontal angle of divergence equal to the angle of convergence $h$ of Fig. 8. In this manner the use of a vertically disposed elliptical directrix 43 for reflectors 30 and 20 provides a desired horizontal beam spread which may be varied by selection of different ellipses as directrix.

Figure 17:
Figure 17 is a diagrammatic plan representation of light source images reflected from one of the ovoidal reflectors to the trimming edge of the reflective shield.

Fig. 17 illustrates sample images L of the light source 25, after reflection from surface 20 or 30, intersecting the lower trimming edge 33 of the reflective shield 32 before striking the cylindrical reflector 15 and shows how this edge chops off small portions of the images to prevent light from reaching the parabolic reflector 15 from points forward of its focal line 16 which is substantially coincident with edge 33.

Figure 9:
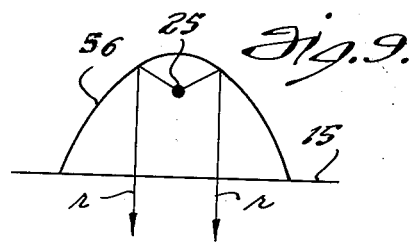
Figure 9 is a diagram similar to that of Fig. 8, but showing the distribution of reflected light from the ovoid obtained by modifying the ovoid directrix to a parabolic curve.
Figure 10:
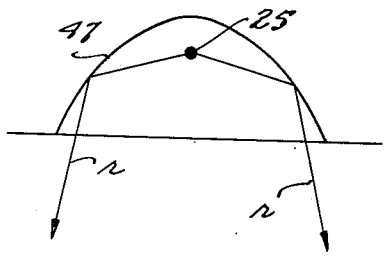
Figure 10 is a diagram similar to Fig. 9, showing the spread of light rays from an ovoid having a modified directrix which is hyperbolic.

If the horizontal spread of the light beam from the projector unit is desired to be small or entirely eliminated, the reflectors 30 and their mating portions 20 may be generated as described and illustrated in Fig. 7, using instead of the elliptical directrix 43 a vertically positioned parabolic curve such as 56 shown in Fig. 9. When the reflector is so formed rays from the proximate focus 25 will be reflected without convergence or divergence. A hyperbolic directrix curve such as 47 may also be used in place of ellipse 43 to obtain different horizontal divergence of the reflected light rays as illustrated in Fig. 10. Any mixed and blended conic section arc may be used as directrix and substituted for the ellipse 43 in order to obtain a prescribed horizontal light distribution, there being shown one such curve 48, Fig. 11, which is partially elliptical (on the right as viewed in the figure) and partially hyperbolic (on the left) and so disposed as to angle all rays from the proximate focus 25 in one horizontal direction upon reflection from the ovoid 30 or 20.

In fabricating the headlamp, the rear and front elements 12 and 11 are formed from suitable material such as glass or metal and the reflecting surfaces coated or electroplated as at 52 with an efficient light reflector such as silver. All of the surfaces are so curved as to permit molding or die pressing each element. The selection of an oblique angle for placement of the sealing flanges 13 and 14 permits the inclusion in one element of the headlamp of the entire cylindrical reflector and at the same time permits the molding of the combined ovoidal reflectors in separate, vertically split halves. In each element sufficient draft is allowed to permit easy shedding of the dies or molds, and for this purpose also, certain of the reflector connecting surfaces such as 23, 37 and 39 are rounded. The cutting off of the sharp corners at the sides of reflector 15 does not materially affect the light beam providing only a wider horizontal spread from these portions to light the sides of the roadway close to the front of the car in which the headlamp is mounted. Another aid to molding is the cutting away of the sharp meeting corners of ovoids 20 to form notches 51, see Fig. 1, through which downwardly directed rays from the light source may pass without reflection by the ovoid to the ultimate reflector 15. Since rays impinging the lower portions $b$ of reflectors 20 are ultimately reflected downwardly and not in the high intensity horizontal portions of the headlamp beam the presence of the notches 51 facilitates molding without lessening the intensity of the beam. The light source supporting stems 27 may be integrally formed in the rear element when both are of glass or may be separately formed and sealed in proper position. Upon joining the front and rear halves, the interior of the headlamp is evacuated or filled with a rare gas while the sealing flanges are fused together to form an hermetic joint.

Figure 11:
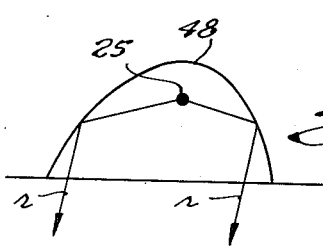
Figure 11 is a diagram similar to Fig. 9, showing the spread of light rays from an ovoid having a modified directrix which is a mixed and blended conic section curve partially elliptical and partially hyperbolic.

Referring to Fig. 14 it will be apparent that the resultant beam obtained from my improved headlamp is composed of horizontally overlapping beams from the three light sources 25. The beam 61 from the central source and the pair of central reflectors 20—30 diverges forwardly in a fan shape. The beams 62 and 63 are preferably crossing beams from the two outer light sources obtained by displacing or shifting the light sources with respect to the proximate foci of their respective ovoid reflectors or by use of mixed conic section curves as directrices for the ovoids as illustrated in Fig. 11. The composite beam obtained is shown in Fig. 15 as it would appear on a vertical screen 66. The driving beam 60 has a relatively sharp cut-off line in a horizontal level including the head lamp surface 35 and this beam is separated by a relatively darkened area 65 from the signal or warning beam 70. The combination of reflectors employed in the headlamp serves to deflect rays, that would normally emerge upwardly, into the beam 60 making this beam more intense and correspondingly subduing the upwardly directed stray light as represented by 65 on the screen.

The presence of the trimming edge 33 of the reflective shield acting in the manner illustrated in Fig. 17 insures that no rays will strike the parabolic reflector as if coming from a source in front of its focal line and consequently the beam will be projected forwardly and downwardly with no light emerging in upward directions other than the intended signal beam and a very minor amount of stray light incident to multiple reflections from the transparent closure 36 and certain of the other connecting surfaces. The stray light may be even further reduced by coating or painting the inner sides of some of the connecting surfaces with a light absorbent medium.

The headlamp may be mounted in a vehicle with all parts concealed save the transparent front surface 36, as diagrammatically shown in Fig. 16. Preferably the mounting will be made to the rear of a protecting bumper and centrally of the vehicle to avoid damage likely to occur when placed at the sides in the fenders. When thus mounted one vertical adjustment to the vehicle is sufficient to adjust the composite beam from the three reflector combinations illustrated. It is apparent that while only three ovoid reflector combinations have been shown and described any desired smaller or larger number of combinations may be employed. The additional reflector combinations may be added laterally, in which case the parabolic reflector and the transparent cover 36 may also be widened as indicated at 36' in Fig. 16.

While I have described my invention in its preferred form as comprising a vehicular headlight it will be understood that its application may be general and not limited to such use. For example, the projector may be applied to the lighting of billboard or building structures and its beam need not be horizontally projected. Various other modifications may be made in form, detail and arrangement of parts of the illustrated embodiment without necessarily departing from the scope and spirit of the invention as set forth in the appended claims.

Having thus described my invention and illustrated its use what I claim as new and desire to secure by Letters Patent is:

1. A light projector comprising a cylindrical reflector having a focal line and adapted to project rays from said focal line in parallel planes, a plurality of light sources, and a plurality of additional reflectors constructed and arranged to reflect rays from the light sources to the cylindrical reflector substantially through and on one side of its focal line, said projector being formed in two parts each having a peripheral flange, juxtaposed and sealed together.

2. A light projector comprising, a plurality of light sources, a plurality of ovoid reflectors, a cylindrical reflector having a focal line, a reflective shield having a straight edge, said light sources being positioned substantially in the proximate foci of said ovoid reflectors, and the remote foci of said ovoids being substantially coincident with the focal line of the cylindrical reflector and said edge of the reflective shield.

3. A light projector as described in claim 2 wherein light rays from said sources impinging said cylindrical reflector are projected through a transparent member and said ovoids, cylindrical reflector and reflective shield are connected together by non-reflecting surfaces.

4. A multiple headlamp as described in claim 2 wherein said reflective shield is provided with a transparent area positioned on one side of the focal line of the cylindrical reflector whereby rays from the light sources passing through said transparent area strike the cylindrical reflector and are reflected to form an angled signal beam.

5. A light projector comprising a cylindrical reflector having a horizontal focal line and vertical parabolic sections, a light source positioned above said focal line, a pair of ovoid reflectors superimposed on the cylindrical reflector and positioned forwardly and rearwardly of the light source, said ovoid reflectors having a proximate focus coincident with the light source and a remote focal line substantially coincident with the focal line of the cylindrical reflector, and a reflecting shield intersecting said forwardly positioned ovoid at an oblique angle and terminating in a substantially straight line trimming edge slightly forward of the focal line of the cylindrical reflector.

6. A headlamp as described in claim 5, wherein each of said ovoids is a blended surface generated by ellipses of varying size having a conic section curve as a directrix, said ellipses extending in the inherent focal reflecting angle of the directrix.

7. A multiple light projector comprising a plurality of light sources, a cylindrical reflector having parabolic sections and a focal line positioned below said light sources, a plurality of forwardly positioned ovoid reflectors each having a proximate focus coincident with one of said light sources and a remote focal line coincident with the focal line of the cylindrical reflector, a reflective shield provided with a straight edge spaced slightly forward of the focal line of the cylindrical reflector, and a plurality of rearwardly positioned ovoids having proximate foci coincident with the light sources and having remote foci positioned so that reflected rays pass rearwardly of said edge of the reflective shield.

8. A multiple headlamp as described in claim 7 wherein each of said ovoids are blended surfaces generated by a substantially vertical ellipse of varying size having a conic section curve as a directrix lying in a substantially vertical plane normal to the plane of the generating ellipse.

9. A multiple headlamp as described in claim 7 wherein each of said ovoids are blended surfaces generated by a substantially vertical ellipse of varying size and having a directrix which is a blended and mixed conic curve lying in a substantially vertical plane containing said focal line of the cylindrical reflector.

10. A multiple headlamp as described in claim 7 wherein each of said ovoids are surfaces formed by a substantially vertical, elliptical generatrix of varying size having one directrix for its vertex, which is a conic section curve lying in a plane which includes said focal line of the cylindrical reflector and said light sources and which is normal to the generatrix, and having a second directrix for its remote focus which is a straight line coincident with said focal line of the cylindrical reflector.

11. A headlamp as described in claim 7, wherein each of said ovoids is a blended surface generated by ellipses of varying size having a conic section curve as a directrix, said ellipses extending in the inherent focal reflecting angle of the directrix.

12. A headlamp as described in claim 7, wherein each of said ovoids is a blended surface generated by ellipses of varying size having a directrix which is a blended and mixed conic curve lying in a plane containing said focal line of the cylindrical reflector, said ellipses extending in the inherent focal reflecting angle of the directrix.

13. A multiple projector comprising, a plurality of light sources, a plurality of forwardly positioned ovoids whose proximate foci are coincident with the light sources, said ovoids being transected by an oblique reflecting shield terminating in a substantially straight edge which is located at their remote focal lines, a plurality of rearwardly positioned ovoids having proximate foci coincident with the light sources and remote focal lines coincident with said edge of the reflective shield, a cylindrical reflector positioned below the last named ovoids and having parabolic sections and a focal line coincident with said edge of the reflective shield, each of said forwardly positioned ovoids being blended surfaces generated by a substantially vertical ellipse of varying size and having a conic section curve as a directrix in a vertical plane, normal thereto and which includes said edge of the reflective shield, each of said rearwardly positioned ovoids being warped surfaces generated by a substantially vertical mixed and blended conic curve of varying size and having a conic section arc as a directrix lying in said vertical plane which includes the directrix of the forwardly positioned ovoid.

14. A multiple light projector comprising a plurality of light sources, a plurality of ovoid reflectors positioned with their proximate foci coincident with the light sources, a cylindrical reflector having a focal line coincident with the remote foci of said ovoid reflectors, a reflective shield terminating in a straight edge coincident with the focal line of said cylindrical reflector, said projector being formed in a plurality of parts each provided with mating flanges and hermetically sealed at said flanges.

15. A light projector element comprising a cylindrical reflector having a focal line, a plurality of ovoid reflectors superimposed on the cylindrical reflector and connected thereto by non-reflective surfaces, said ovoid reflectors having remote foci in the region of the focal line of the cylindrical reflector, and a perimetric flange for sealing said element to a mating section of a light projector.

16. An element for a light projector as described in claim 14, said element being additionally provided with a plurality of light sources positioned at the proximate foci of said ovoid reflectors.

17. A light projector element as described in claim 14 wherein said flange falls in a plane extending from above the ovoid reflectors to the bottom edge of the cylindrical reflector.

18. A light projector element comprising a plurality of laterally spaced ovoid reflectors each intersected by a planar reflector extending from the surfaces of the ovoids to a line containing the remote foci thereof, said planar reflector being connected by a non-reflective surface to a transparent surface, said reflectors and surfaces being bounded by and connected to a peripheral flange for sealing to a mating section of a light projector.

19. A light projector element constructed as described in claim 18 wherein said flange extends in an inclined plane from above the ovoid reflectors to below the bottom of said transparent surface, said ovoids and transparent surface lying on one side of the plane and said planar reflector extending across the plane of the sealing flange.

20. A light projector comprising, a cylindrical reflector having a focal line and adapted to project rays from said focal line in parallel planes, a light source positioned above said focal line, a truncated ovoidal reflector superimposed on the cylindrical reflector and so positioned with respect to the light source as to reflect rays therefrom to the cylindrical reflector substantially through and on one side of its focal line, said ovoidal reflector being split in a plane which includes the light source and said focal line and said projector being split in a plane inclined to said first named plane.

HAROLD E. SMITH.

REFERENCES CITED

The following references are of record in the file of this patent:

UNITED STATES PATENTS

| Number | Name | Date |
| --- | --- | --- |
| 1,351,169 | Hotchkin | Aug. 31, 1920 |
| 1,913,519 | Smith et al. | June 13, 1933 |
| 2,288,352 | Henderson | June 30, 1942 |